US012810491B2

(12) United States Patent
Zhang et al.

(10) Patent No.: US 12,810,491 B2
(45) Date of Patent: Nov. 24, 2026

(54) COMPUTING PERCEPTUAL SIMILARITY DIRECTLY IN LATENT SPACE

(71) Applicant: ADOBE INC., San Jose, CA (US)

(72) Inventors: Richard Zhang, Burlingame, CA (US); Taesung Park, Sunnyvale, CA (US); Michaël Gharbi, San Francisco, CA (US); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 113 days.

(21) Appl. No.: 18/827,195

(22) Filed: Sep. 6, 2024

(65) Prior Publication Data

US 2026/0073576 A1 Mar. 12, 2026

(51) Int. Cl.
*G06T 11/00* (2026.01)
*G06T 5/60* (2024.01)

(52) U.S. Cl.
CPC ................ *G06T 11/00* (2013.01); *G06T 5/60* (2024.01)

(58) Field of Classification Search
CPC . G06T 11/00; G06T 5/60; G06T 2207/20081; G06V 10/761; G06V 10/82; G06N 3/0475
See application file for complete search history.

(56) References Cited

U.S. PATENT DOCUMENTS 12,079,948 B2 * 9/2024 Park .................... G06F 3/04847
12,131,416 B2 * 10/2024 Lombardi ................. G06T 7/97
12,272,031 B2 * 4/2025 Singh ................... G06V 10/774
2022/0254071 A1 * 8/2022 Ojha ....................... G06N 3/045
2023/0377324 A1 * 11/2023 Kim ........................ G06V 10/82
2024/0104842 A1 * 3/2024 Nagano ...................... G06T 7/70
2025/0166307 A1 * 5/2025 Gadelha .................. G06T 19/00
(Continued)

FOREIGN PATENT DOCUMENTS

CN 120894466 A * 11/2025 ............. G06N 3/084
CN 120976019 A * 11/2025 ........... G06V 10/774

OTHER PUBLICATIONS

Deng, et al., "ImageNet: A Large-Scale Hierarchical Image Database", 2009, 8 pages.
(Continued)

*Primary Examiner* — Chante E Harrison
(74) *Attorney, Agent, or Firm* — F. CHAU & ASSOCIATES, LLC

(57) ABSTRACT

A method, apparatus, non-transitory computer readable medium, and system for assessing perceptual similarity include training an image generation model based on a latent code perceptual similarity by obtaining training data including a first latent code representing a first image and a second latent code representing a second image and encoding, using a perceptual similarity model, the first latent code and the second latent code to obtain a first feature stack and a second feature stack, respectively. The perceptual similarity model generates the latent code perceptual similarity based on the first feature stack and the second feature stack, wherein the latent code perceptual similarity represents a perceptual similarity between the first image and the second image. Then parameters of the image generation model are updated based on the latent code perceptual similarity.

18 Claims, 14 Drawing Sheets

(56) References Cited

U.S. PATENT DOCUMENTS

2025/0272807 A1* 8/2025 Canet Tarrés ....... G06N 3/0455

OTHER PUBLICATIONS

Simonyan, et al., "Very Deep Convolutional Networks for Large-Scale Image Recognition", arXiv preprint arXiv:1409.1556v6 [cs.CV] Apr. 10, 2015, 14 pages.

Zhang, et al., "The Unreasonable Effectiveness of Deep Features as a Perceptual Metric". arXiv preprint arXiv:1801.03924v2 [cs.CV] Apr. 10, 2018, 14 pages.

* cited by examiner

Assessing Similarity to the Center Image

| | | |
|---|---|---|
| | Humans | ✓ |
| ✓ | L2/PSNR | |
| ✓ | SSIM/FSIMc | |
| | Image-To-Feature Perceptual Similarity | ✓ |
| | Latent Perceptual Similarity (400x faster than Image-To-Latent) | ✓ |

515

COMPUTING PERCEPTUAL SIMILARITY DIRECTLY IN LATENT SPACE

BACKGROUND

The following relates generally to image processing, and more specifically to computing a perceptual similarity metric. The perceptual similarity metric, sometimes referred to as a "perceptual loss," may be used to train generative models. Image processing is a type of data processing that involves the manipulation of an image to achieve a desired output, typically utilizing specialized algorithms and techniques. It is used to perform operations on an image to enhance its quality or to extract useful information. Generative models are a subset of machine learning (ML) techniques and are used to generate data that approximates information learned from a training distribution. Generative models can be used, for example, to create new image content.

There are many types of generative models, including Generative Adversarial Networks (GANs), Variational Autoencoders (VAEs), and denoising diffusion probabilistic models (DDPMs). Diffusion models generate image data by iteratively refining a noisy image towards a less noisy version to produce a coherent image. In some cases, diffusion models are trained by first progressively adding noise to an image, and then teaching the model to denoise the image by comparing the model's prediction to a known, lesser-noised version of the image. This comparison may entail computing a pixel-wise loss such as Mean Squared Error (MSE). In some cases, models may be trained using other types of losses, such as the perceptual loss. The perceptual loss measures the perceptual similarity between images rather than pixel-wise differences. This type of loss is useful for applications such as image super-resolution, style transfer, and image inpainting.

SUMMARY

Embodiments of the inventive concepts described herein include systems and methods for assessing perceptual similarity in latent space. Assessing perceptual similarity is a fundamental building block of many image synthesis models. However, in some cases, a pixel-wise comparison between images does not accurately measure differences that humans will perceive between the images. There exist methods for assessing perceptual similarity by encoding images using neural networks to obtain deep representations of the images, and then measuring the differences between the encodings. However many ML models do not directly generate image data, but rather produce latent codes which are then decoded at inference to yield the image data. Decoding these latent codes to obtain images for assessing perceptual similarity can be computationally expensive.

Embodiments include a perceptual similarity model configured to process two latent codes directly. The perceptual similarity model receives the two latent codes and generates deep features, referred to as feature stacks. The two feature stacks are combined to yield a combined feature stack, which is then averaged down in all dimensions to generate a scalar latent code perceptual similarity representing the perceptual difference between the images. In some embodiments, the latent code perceptual similarity is used to train an image generation model to generate more accurate synthetic images.

A method, apparatus, non-transitory computer readable medium, and system for training a machine learning model are described. The method, apparatus, non-transitory computer readable medium, and system include obtaining training data including a first latent code representing a first image, a second latent code representing a second image, and ground-truth perceptual similarity between the first image and the second image; and training, using the training data, a perceptual similarity model to determine a latent code perceptual similarity between the first latent code and the second latent code.

A method, apparatus, non-transitory computer readable medium, and system for training a machine learning model are described. The method, apparatus, non-transitory computer readable medium, and system include training an image generation model based on a latent code perceptual similarity by: obtaining training data including a first latent code representing a first image and a second latent code representing a second image; encoding, using a perceptual similarity model, the first latent code and the second latent code to obtain a first feature stack and a second feature stack, respectively; and generating, using the perceptual similarity model, the latent code perceptual similarity based on the first feature stack and the second feature stack, wherein the latent code perceptual similarity represents a perceptual similarity between the first image and the second image.

A method, apparatus, non-transitory computer readable medium, and system for image processing are described. One or more aspects of the method, apparatus, non-transitory computer readable medium, and system include obtaining an input prompt describing an image element; generating, using an image generation model, a latent code representing perceptual attributes of the image element based on the input prompt, wherein the image generation model is trained to generate the perceptual attributes using a latent code perceptual similarity between training latent codes; and generating, using the image generation model, a synthetic image depicting the image element with the perceptual attributes based on the latent code.

A method, apparatus, non-transitory computer readable medium, and system for computing a latent code perceptual similarity are described. One or more aspects of the method, apparatus, non-transitory computer readable medium, and system include obtaining a first latent code representing a first image and a second latent code representing a second image; encoding, using a perceptual similarity model, the first latent code and the second latent code to obtain a first feature stack and a second feature stack, respectively; generating, using the perceptual similarity model, a latent code perceptual similarity based on the first feature stack and the second feature stack, wherein the latent code perceptual similarity represents a perceptual similarity between the first image and the second image; and training an image generation model based on the latent code perceptual similarity.

An apparatus, system, and method for image processing are described. One or more aspects of the apparatus, system, and method include at least one processor; at least one memory storing instructions executable by the at least one processor; and an image generation model comprising parameters stored in the at least one memory and trained to generate a latent code representing perceptual attributes of the image element based on the input prompt and to generate a synthetic image depicting the image element with the perceptual attributes based on the latent code wherein the image generation model is trained to generate the perceptual attributes based a latent code perceptual similarity between training latent codes.

DETAILED DESCRIPTION

Figure 1:
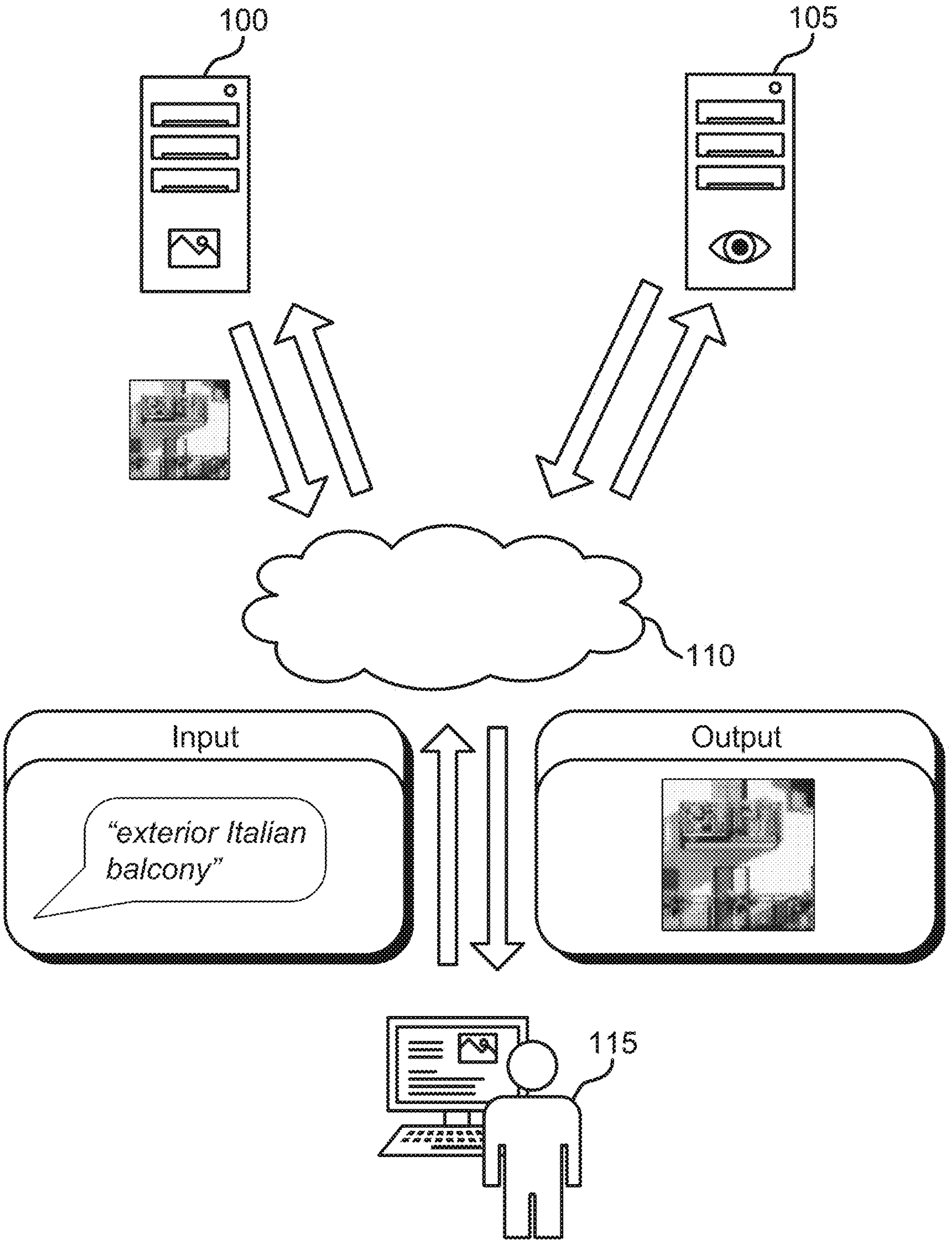
FIG. 1 shows an example of an image processing system according to aspects of the present disclosure.

Image generation is frequently used in creative workflows. Historically, users would rely on manual techniques and drawing software to create visual content. The advent of machine learning (ML) has enabled new workflows that automate the image creation process.

ML is a field of data processing that focuses on building algorithms capable of learning from and making predictions or decisions based on data. It includes a variety of techniques, ranging from simple linear regression to complex neural networks, and plays a significant role in automating and optimizing tasks that would otherwise require extensive human intervention.

Generative models in ML are algorithms designed to generate new data samples that resemble a given dataset. Generative models are used in various fields, including image generation. They work by learning patterns, features, and distributions from a dataset and then using this understanding to produce new, original outputs.

Generative models follow various training paradigms according to the type of data they generate, their model architecture, the training objectives, and other factors. For example, Generative Adversarial Networks (GANs) use a generator and a discriminator network, where the generator creates new data samples and the discriminator evaluates their authenticity. Variational Autoencoders (VAEs) employ an encoder-decoder structure to learn a compressed representation of data and generate new samples by decoding this representation. Diffusion models, another class of generative models, progressively add noise to training data and learn to reverse this process to generate new data.

During training, some image generation models utilize a loss function that quantifies differences between a predicted image and a desired (e.g., "ground-truth" image). During a large pretraining phase, diffusion models typically use a denoising objective that minimizes pixel-wise differences between the generated and target images. However, perceptual losses are sometimes employed in their training, especially during fine-tuning for a particular task such as upsampling, inpainting, or light harmonization. A perceptual loss measures differences in high-level features extracted from a neural network, capturing perceptual similarity rather than just pixel-wise accuracy. This can help the model generate images that are more visually appealing and closer to human perception.

To compute perceptual loss, a conventional approach involves encoding images using a neural network to obtain deep feature representations and then measuring the differences between these feature representations. This process, however, can be computationally expensive. Recent generative models produce samples in a latent space with reduced dimensionality for more efficient computation. The conventional approach therefore requires decoding the latent code samples to obtain images, and then re-encoding these images using a feature extraction network to obtain features to compare. For example, the Learned Perceptual Image Patch Similarity (LPIPS) metric operates in this fashion. LPIPS first decodes the latent representations back into image space and then uses a pre-trained network to extract perceptual features from these images. The perceptual similarity is then measured by comparing the extracted features. The two-step process incurs additional computational cost due to the decoding and re-encoding steps.

Embodiments of the present disclosure improve the efficiency of training machine learning models. Embodiments extract feature stacks from input latent codes directly, and then compute a latent code perceptual similarity based on the feature stacks. By omitting the decoding step and performing the feature extraction on latent codes with reduced dimensionality, embodiments speed up the perceptual similarity process by several hundred times with respect to conventional decode-encode approaches. In some cases, embodiments further train an image generation model using the latent code perceptual similarity to produce more accurate and higher quality synthetic images.

A system for generating images and computing a latent code perceptual similarity is described with reference to FIGS. 1-8. Methods for generating images and training machine learning models are described with reference to FIGS. 9-11. A computing device configured to implement an image processing apparatus, a perceptual similarity apparatus, or both is described with reference to FIG. 12.

Image Processing System

FIG. 1 shows an example of an image processing system according to aspects of the present disclosure. The example shown includes image processing apparatus 100, perceptual similarity apparatus 105, network 110, and user 115. In this example, user 115 provides a text description of an image as input to the system. Then, image processing apparatus 100, previously trained by perceptual similarity apparatus 105, generates a synthetic image based on the text description. In some embodiments, an image generation model of the image processing system 100 generates a latent code representing the synthetic image, and a separate decoder decodes the latent code to generate the image. In some embodiments, the decoder is included with the image generation model.

In some examples, the image processing apparatus 100 generates a latent code representing perceptual attributes of an image element described in the text description. For example, if the prompt is "exterior Italian balcony", the latent code can represent stylistic and geometric attributes a human would associate with an exterior Italian balcony such as straight vertical bars for the railing, natural lighting, Italian architectural elements, etc.

Components of image processing apparatus 100 and perceptual similarity apparatus 105 may be implemented on a server. A server provides one or more functions to users such as user 115 linked by way of one or more of the various available networks, such as network 110. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a super computer, or any other suitable processing apparatus.

Network 110 facilitates the transfer of information between image processing apparatus 100, perceptual similarity apparatus 105, and user 115. Network 110 is sometimes referred to as a "cloud." A cloud is a computer network configured to provide on-demand availability of computer system resources, such as data storage and computing power. In some examples, the cloud provides resources without active management by user 115. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

User 115 may interact with the image processing system via a user interface. In some embodiments, the user interface may include an audio device, such as an external speaker system, an external display device such as a display screen, or an input device (e.g., remote control device interfaced with the user interface directly or through an IO controller module). In some cases, a user interface may include a graphical user interface (GUI). The GUI may include elements to allow the user to provide the inputs to the system and view the outputs generated by the system.

Figure 2:
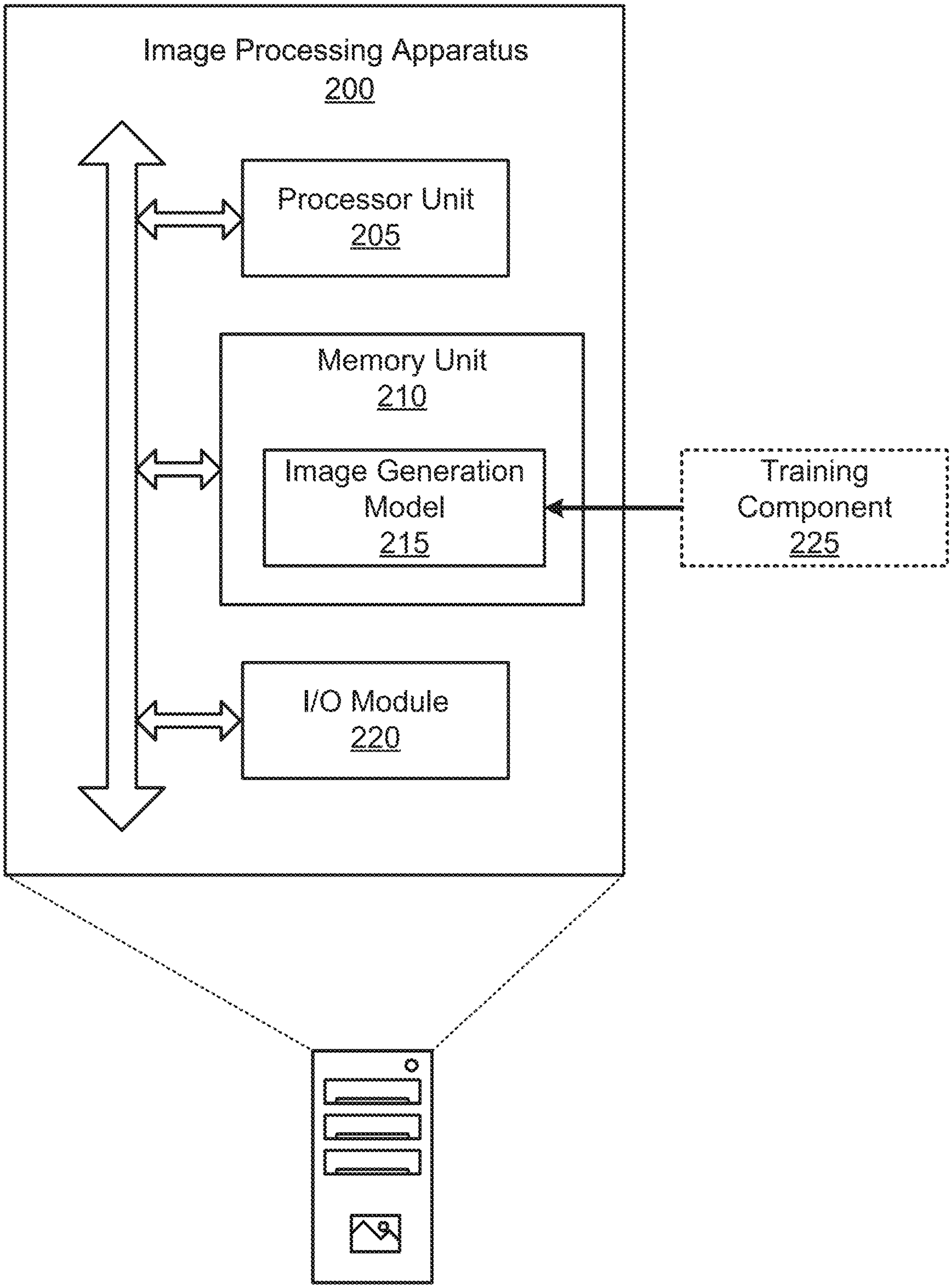
FIG. 2 shows an example of an image processing apparatus according to aspects of the present disclosure.

FIG. 2 shows an example of an image processing apparatus 200 according to aspects of the present disclosure. The example shown includes image processing apparatus 200, processor unit 205, memory unit 210, I/O module 220, and training component 225. Image processing apparatus 200 is an example of, or includes aspects of, the corresponding element described with reference to FIG. 1.

Processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some aspects, processor unit 205 includes special purpose components for modem processing, baseband processing, digital signal processing, or transmission processing. According to some aspects, processor unit 205 comprises one or more processors described with reference to FIG. 12.

Memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 205 to perform various functions described herein.

In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state. According to some aspects, memory unit 210 is an example of the memory subsystem 1210 described with reference to FIG. 12.

According to some aspects, image processing apparatus 200 uses one or more processors of processor unit 205 to execute instructions stored in memory unit 210 to perform functions described herein. For example, the image processing apparatus 200 may generate a latent code representing an image element and generate synthetic image depicting the image element based on the latent code.

The memory unit 210 may include an image generation model 215 trained generate synthetic images. For example, after training, the image generation model 215 may perform inferencing operations as described with reference to FIGS. 7 and 9.

In some embodiments, the image generation model 215 is an Artificial neural network (ANN) such as the guided diffusion model described with reference to FIG. 7 and the U-Net described with reference to FIG. 8. An ANN can be a hardware component or a software component that includes connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

ANNs have numerous parameters, including weights and biases associated with each neuron in the network, which control the degree of connection between neurons and influence the neural network's ability to capture complex patterns in data. These parameters, also known as model parameters or model weights, are variables that determine the behavior and characteristics of a machine learning model.

In some cases, the signals between nodes comprise real numbers, and the output of each node is computed by a function of its inputs. For example, nodes may determine their output using other mathematical algorithms, such as selecting the max from the inputs as the output, or any other suitable algorithm for activating the node. Each node and edge are associated with one or more node weights that determine how the signal is processed and transmitted. In some cases, nodes have a threshold below which a signal is not transmitted at all. In some examples, the nodes are aggregated into layers.

The parameters of image generation model 215 can be organized into layers. Different layers perform different transformations on their inputs. The initial layer is known as the input layer and the last layer is known as the output layer. In some cases, signals traverse certain layers multiple times. A hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

According to some aspects, image generation model 215 generates a latent code representing an image element, where the image generation model 215 is trained based on a latent code perceptual similarity between training latent codes. The latent code perceptual similarity may be generated by, for example, training component 225. In some examples, image generation model 215 denoises a noise map to obtain the latent code. In some examples, image generation model 215 decodes the latent code to obtain the synthetic image.

I/O module 220 receives inputs from and transmits outputs of the image processing apparatus 200 to other devices or users. For example, I/O module 220 receives inputs for the image generation model 215 and transmits outputs of the image generation model 215. According to some aspects, I/O module 220 is an example of the I/O interface 1220 described with reference to FIG. 12.

Training component 225 may train the image generation model 215. For example, parameters of the image generation model 215 can be learned or estimated from training data and then used to make predictions or perform tasks based on learned patterns and relationships in the data. In some examples, the parameters are adjusted during the training process to minimize a loss function or maximize a performance metric (e.g., as described with reference to FIGS. 10 and 11). The goal of the training process may be to find optimal values for the parameters that allow the machine learning model to make accurate predictions or perform well on the given task. The performance metric may be, for example, a latent code perceptual similarity that quantifies the perceptual differences between a latent code predicted by the image generation model 215 during training and a ground-truth latent code. According to some aspects, training component 225 is, or includes elements of, the perceptual similarity apparatus described with reference to FIG. 3.

Accordingly, the node weights can be adjusted to improve the accuracy of the output (i.e., by minimizing a loss which corresponds in some way to the difference between the current result and the target result). The weight of an edge increases or decreases the strength of the signal transmitted between nodes. For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the image generation model 215 can be used to make predictions on new, unseen data (i.e., during inference).

Accordingly, the image generation model can be trained based on a latent code perceptual similarity by: obtaining training data including a first latent code representing a first image and a second latent code representing a second image; encoding, using a perceptual similarity model, the first latent code and the second latent code to obtain a first feature stack and a second feature stack, respectively; and generating, using the perceptual similarity model, the latent code perceptual similarity based on the first feature stack and the second feature stack, wherein the latent code perceptual similarity represents a perceptual similarity between the first image and the second image.

Figure 3:
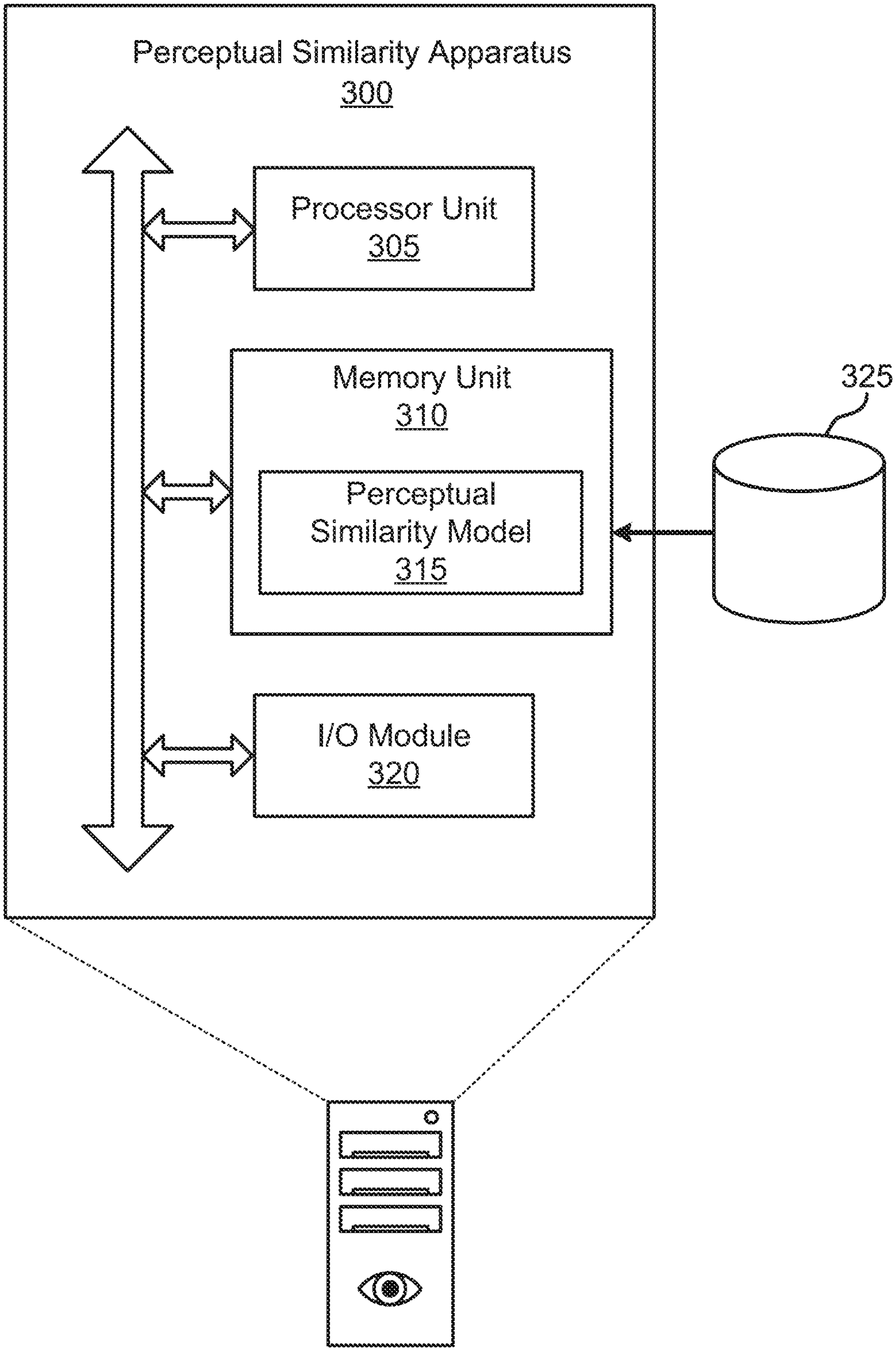
FIG. 3 shows an example of a perceptual similarity apparatus according to aspects of the present disclosure.

FIG. 3 shows an example of a perceptual similarity apparatus 300 according to aspects of the present disclosure. The example shown includes perceptual similarity apparatus 300, processor unit 305, memory unit 310, I/O module 320, and database 325. Perceptual similarity apparatus 300 is an example of, or includes aspects of, the corresponding element described with reference to FIG. 1. Perceptual similarity model 315 is an example of, or includes aspects of, the corresponding element described with reference to FIG. 4. The processor unit 305, memory unit 310, and I/O module 320 may be the same or similar to the corresponding elements described with reference to FIG. 2. Accordingly, the following description of the embodiment depicted in FIG. 3 will focus mainly on the remaining elements shown.

In one aspect, memory unit 310 includes perceptual similarity model 315. Perceptual similarity model 315 includes an ANN-based feature extractor as well as an averaging component. The feature extractor generates two feature stacks from two input latent codes and combines the feature stacks to generate a combined feature stack that is a multi-dimensional representation of the perceptual distance between the two input latent codes. The averaging component then performs channel-wise averaging operations on the combined feature stack to obtain a scalar value representing the perceptual distance. This scalar value is referred to as a "latent code perceptual similarity" herein. The latent code perceptual similarity is a measure of how similar the two input latent codes would be perceived as images, if they were to be decoded.

Database 325 provides information used by perceptual similarity apparatus 300, such as training data (images and latent codes), model parameters, embeddings, and the like. A database is an organized collection of data. For example, database 325 stores data in a specified format known as a schema. A database may be structured as a single database, a distributed database, multiple distributed databases, or an emergency backup database. In some cases, a database controller may manage data storage and processing in database 325. In some cases, a user interacts with the database controller. In other cases, the database controller may operate automatically without user interaction. The database 325 may also provide information to an image processing apparatus such as the one described with reference to FIG. 2.

According to some aspects, perceptual similarity model 315 encodes a first latent code and a second latent code to obtain a first feature stack and a second feature stack, respectively. In some examples, perceptual similarity model 315 generates a latent code perceptual similarity based on the first feature stack and the second feature stack, where the latent code perceptual similarity represents a perceptual similarity between a first image and a second image.

In some examples, perceptual similarity model 315 successively generates features at a set of levels, where each successive level of the set of levels has a smaller number of pixels or a larger number of channels than a previous level of the set of levels. In some aspects, the perceptual similarity model 315 includes a feature pyramid network including a set of feature levels.

In some examples, perceptual similarity model 315 generates a combined feature stack by combining the first feature stack and the second feature stack, where the latent code perceptual similarity is based on the combined feature stack. In some examples, perceptual similarity model 315 normalizes the first feature stack and the second feature stack to obtain a first normalized feature stack and a second normalized feature stack, respectively. In some examples, perceptual similarity model 315 subtracts the second normalized feature stack from the first normalized feature stack to obtain the combined feature stack.

In some examples, perceptual similarity model 315 weights the combined feature stack using weights of the perceptual similarity model 315 to obtain a weighted feature stack, where the latent code perceptual similarity is based on the weighted feature stack. In some examples, perceptual similarity model 315 computes an L1 norm and a spatial average based on the weighted feature stack to obtain the latent code perceptual similarity. In some examples, perceptual similarity model 315 computes a perceptual similarity loss based on the latent code perceptual similarity. In some aspects, the perceptual similarity model 315 generates the latent code perceptual similarity without decoding the training latent codes. Additional detail regarding the perceptual similarity model 315 is provided with reference to FIG. 6.

Accordingly, training the perceptual similarity model can include obtaining training data including a first latent code representing a first image, a second latent code representing a second image, and ground-truth perceptual similarity between the first image and the second image; and training, using the training data, the perceptual similarity model to determine a latent code perceptual similarity between the first latent code and the second latent code.

Figure 4A:
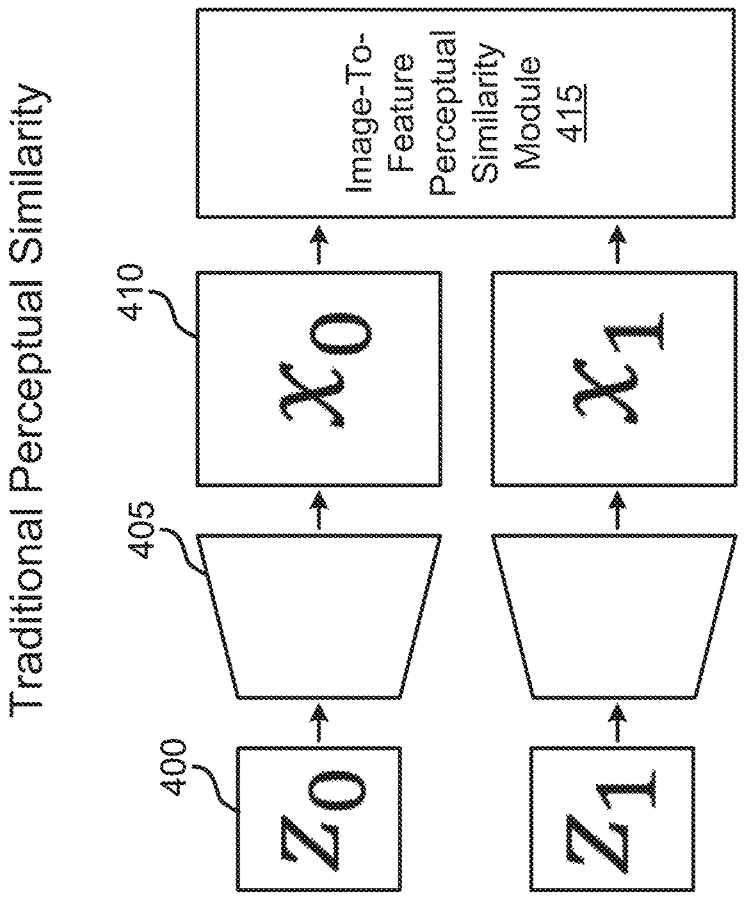
FIGS. 4A and 4B show an example of traditional perceptual similarity and improved perceptual similarity according to aspects of the present disclosure.
Figure 4B:
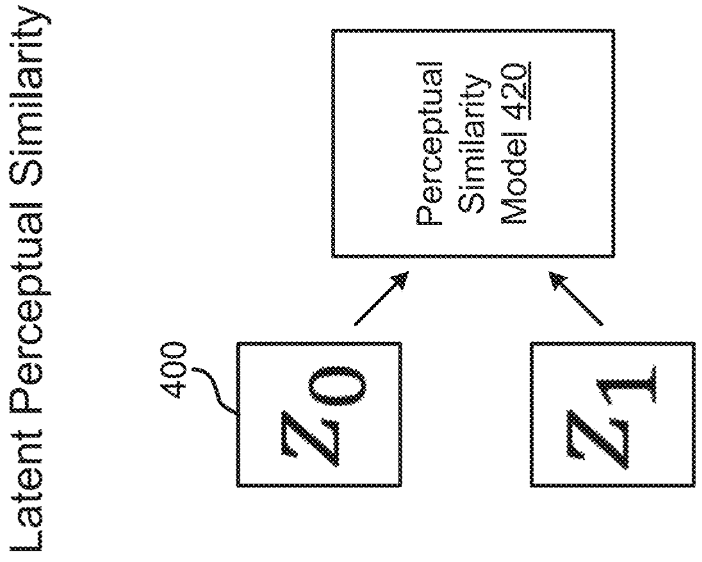

FIGS. 4A and 4B show examples of traditional perceptual similarity and improved perceptual similarity, respectively, according to aspects of the present disclosure. The example shown includes latent codes 400, image decoder 405, images 410, image-to-feature perceptual similarity module 415, and perceptual similarity model 420. Perceptual similarity model 420 is an example of, or includes aspects of, the corresponding element described with reference to FIG. 3.

In a traditional approach for assessing perceptual similarity, an image decoder 405 first decodes latent codes 400 to obtain images 410. "Latent codes" refer to intermediate representations generated by generative models, and may correspond to node values in deep layers of an ANN. The latent codes typically have a lower spatial dimensionality (e.g., height and width dimensions) and increased channel dimensionality (sometimes referred to as "depth" dimensions) compared to images, which are in the pixel space. Many generative models, such as the latest diffusion models, operate within this latent space for increased efficiency due to the reduced dimensions. According to some aspects, the decoding step may use up to 90%-96% of the computation time involved in assessing perceptual similarity in the traditional way. Then, the image-to-feature perceptual similarity module 415 processes the pixel images to generate feature stacks which are then used to compute a perceptual similarity.

In contrast, the present embodiments are configured to assess perceptual similarity directly in the latent space. The perceptual similarity model 420 receives latent codes 400 and generates feature stacks directly therefrom, which are used to compute a perceptual similarity. This approach can accelerate perceptual evaluation by bypassing the decoding step, which significantly reduces computation time. For example, evaluation time can be reduced by more than 400 times, from 1690 ms to 4 ms. This is achieved by avoiding the decoding step and leveraging the low-dimensionality of latent space.

In some cases, operating in the latent space improves perceptual performance. This improvement is observed in datasets where perceptual similarity is measured. For example, the latent perceptual similarity approach can surpass benchmarks used to evaluate perceptual similarity measurements, indicating that the latent space provides a more effective domain for assessing perceptual similarity. According to some aspects, the latent space abstracts away perceptually irrelevant details, resulting in a more efficient and appropriate space for evaluating perceptual differences.

Aspects of the present disclosure are applicable to any encoder system. Emergent representations trained in latent space match well with human perceptual judgments. In some cases, embodiments further calibrate the extracted features through learned linear weighting of the features to better align with human perception. Additionally, some embodiments further utilize L1 normalization on features instead of the L2 normalization for more accurate image generation during inference. Some embodiments further include the raw input latent code as a layer to the feature extraction network. Additional detail regarding a specific perceptual similarity model is provided with reference to FIG. 6.

Figure 5:
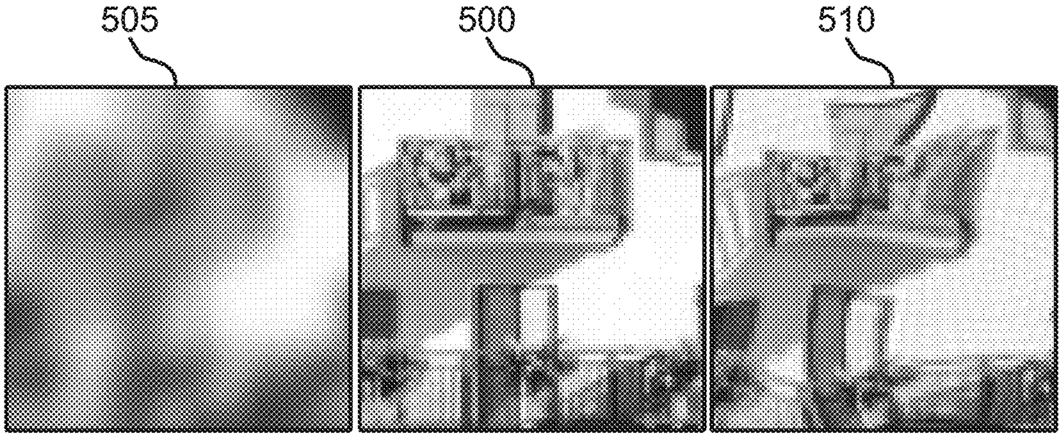
FIG. 5 shows an example of similarity metrics according to aspects of the present disclosure.

FIG. 5 shows an example of similarity metrics according to aspects of the present disclosure. The example shown includes reference image 500, blurred image 505, skewed image 510, and various similarity assessments 515.

The similarity assessments 515 show the results of comparing the images using different methods. These methods include human assessments, L2 norm (Least Squares), PSNR (Peak Signal-to-Noise Ratio), SSIM (Structural Similarity Index), FSIMC (Feature Similarity Index with chromatic components), image-to-feature perceptual similarity (such as LPIPS—Learned Perceptual Image Patch Similarity), and latent perceptual similarity (the present embodiments).

Rule-based approaches for assessing similarity, such as L2 norm and PSNR, rely on pixel-wise comparisons and measure the exact differences between pixel values. SSIM and FSIMC improve upon these methods by considering changes in structural information rather than just pixel values. These methods analyze factors like luminance, contrast, and structure to provide a more holistic measure of similarity that aligns better with human visual perception. However, as shown in the Figure, these approaches still consider the blurred image 505 to be more similar to the reference image 500 than the skewed image 510, despite the heavy blurring that obfuscates details such as the balcony, door, and plants. The present embodiments provide improved perceptual similarity assessments afforded by LPIPS while significantly improving inference time.

Figure 6:
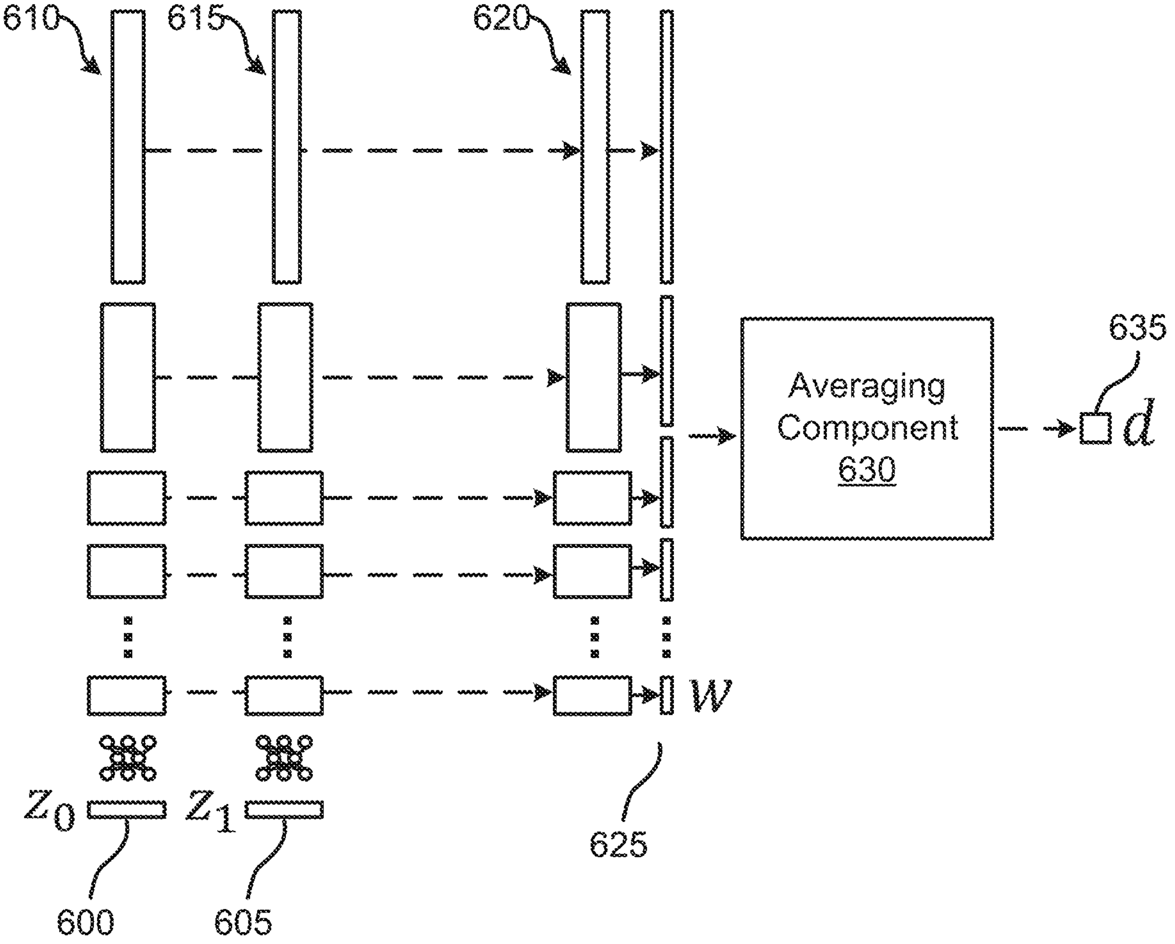
FIG. 6 shows an example of a perceptual similarity model architecture according to aspects of the present disclosure.

FIG. 6 shows an example of a perceptual similarity model architecture according to aspects of the present disclosure.

The example shown includes first latent code 600, second latent code 605, first feature stack 610, second feature stack 615, combined feature stack 620, weighting vector 625, averaging component 630, and latent code perceptual similarity scalar 635.

Consider a general encoder E and a decoder D that bring images x into a latent space z and vice versa. For example, z=E(x) and x=D (z), though E and D may not be perfect inverses in some embodiments. In one example, x is in a pixel space: $x \in \mathbb{R}^{512\times512\times3}$, and z is in a downsampled latent space such as: $z \in \mathbb{R}^{64\times64\times C}$, where C is a number of latent channels chosen based on the design of the latent space inherent to E and D. Embodiments of the present disclosure learn a perceptual distance function $\mathcal{L}_{perceptual}(z_0, z_1)$ that assess the perceptual distance between two images $x_0$, $x_1$ directly in their latent space counterparts.

Traditional approaches to assessing perceptual similarity include learning feature stacks based on input images, e.g. $\{F_i(x)\}$, and then computing the distance between them. However, as previously discussed, this entails decoding latent codes to obtain the images. In contrast, present embodiments learn a feature stack directly on the latent code, e.g. $\{F_i(z)\}$, take the distance between features, and sum across them. Accordingly, $\mathcal{L}_{perceptual}$ can be expressed by the following equation:

$$\begin{aligned}\mathcal{L}_{perceptual}(z_0, z_1) &= \|F(z_0) - F(z_1)\|_p \\ &= \sum_i \|w_i \odot F_i(z_0) - w_i \odot F_i(z_1)\|_p\end{aligned} \tag{1}$$

where $F_i$ is a bank of features (sometimes referred to as a "feature stack," and including different feature levels with different dimensionalities), $w_i$ is a vector of weights across channels, and $\odot$ is the Hadamard product.

Accordingly, the perceptual similarity model receives the first latent code 600 and second latent code 605 as input latents, and computes, using a series of feature extractors, first feature stack 610 and second feature stack 615 therefrom. Then the perceptual similarity model combines the two feature stacks to yield combined feature stack 620. For example, the model may normalize first feature stack 610 and second feature stack 615, and then subtract the normalized second feature stack 615 from the normalized first feature stack 610 to generate combined feature stack 620. Then, each feature level in combined feature stack 620 may be weighted according to weighting vector 625 and averaged across dimensions using averaging component 630 to obtain the final measurement of perceptual similarity, latent code perceptual similarity scalar 635.

The following will now describe how the feature extractor networks and the weighting vector 625 of the perceptual similarity model are trained. In an example, the feature extractor networks are trained to generate feature stacks for a classification task; that is, they are components of a classifier network. To train the feature extractors for the classification task based on latent data, embodiments use a cross-entropy loss such as the following:

$$\text{argmin}_F\, \mathcal{L}_{cross-entropy}(F(E(x)), y) \tag{2}$$

where E is the encoder of, for example, an image generation model, and y denotes the class labels in a classifier dataset such as ImageNet.

Embodiments may utilize a modified VGG network as a feature extractor network. In some cases, since embodiments are operating on latent codes with reduced dimensions as compared to pixel images, embodiments modify the VGG network F by removing one or more downsampling max-pooling layers in the VGG network. In one example, embodiments remove the first 3 max-pooling layers. In some cases, embodiments further employ an L1 normalization when normalizing the features rather than an L2 normalization to reduce inference time. Furthermore, embodiments may perform the feature normalization on all layers except for the layer corresponding to the input latent codes.

Embodiments of the perceptual similarity model may be further trained to learn values of weighting vector 625. The weighting vector 625 represents the relative importance for each feature level in determining the final latent code perceptual similarity scalar. In some cases, embodiments utilize a training set such as the BAPPS dataset that includes a first image, a second image, a reference image, and a value indicating whether a human expert considers the first image or the second image to be closer to the reference image perceptually. The tuples in this training data may be accordingly denoted as $(x_0, x_1, x_{ref}, h)$, where h=0 means that the human's judgement is that $x_0$ is closer to $x_{ref}$ than $x_1$, and h=1 means that the human's judgement is that $x_1$ is closer to $x_{ref}$ than $x_0$. Accordingly, embodiments perform the following optimization:

$$\text{argmin}_{w_i}\, \mathcal{L}_{cross-entropy}(H(d_0, d_1), h) \tag{3}$$

where $\mathcal{L}_{perceptual}(z_A, z_B) = \Sigma_i \|w_i \odot F_i(z_A) - w_i \odot F_i(z_B)\|_1$, $d_0 = \mathcal{L}_{perceptual}(z_0, z_{ref})$, and $d_1 = \mathcal{L}_{perceptual}(z_1, z_{ref})$, and H is a multi-layer perceptron (MLP) used to map the two distances into a soft prediction of which image is closer. This forms the final metric for two input latents $z_0$, $z_1$:

$$\mathcal{L}_{perceptual}(z_0, z_1) = \sum_i \|w_i \odot F_i(z_0) - w_i \odot F_i(z_1)\|_1 \tag{4}$$

Figure 7:
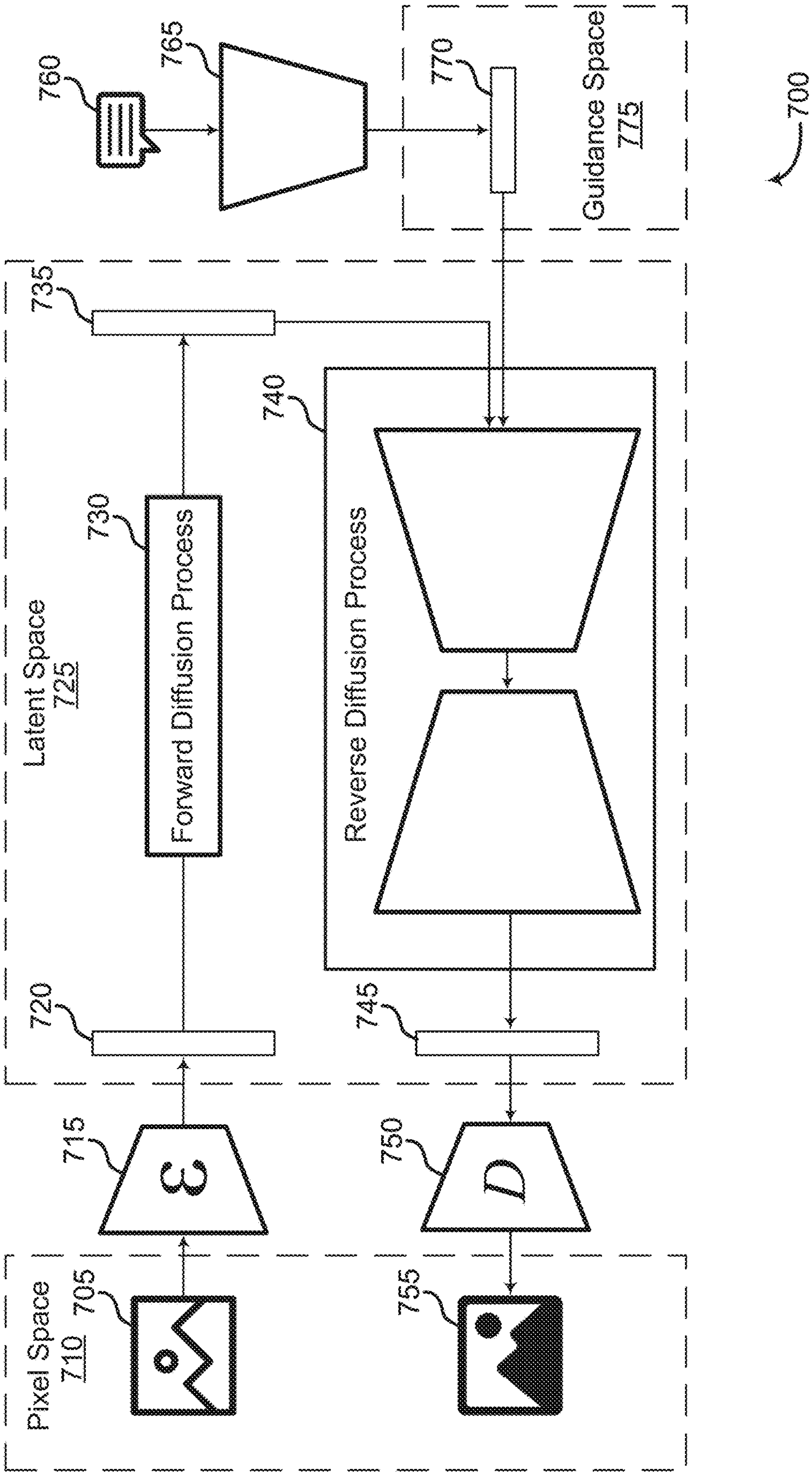
FIG. 7 shows an example of a guided latent diffusion model according to aspects of the present disclosure.

FIG. 7 shows an example of a guided latent diffusion model according to aspects of the present disclosure. The guided latent diffusion model 700 depicted in FIG. 2 is an example of, or includes aspects of, the image generation model described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 700 may take an original image 705 in a pixel space 710 as input and apply and image encoder 715 to convert original image 705 into original image features 720 in a latent space 725. Then, a forward diffusion process 730 gradually adds noise to the original image features 720 to obtain noisy features 735 (also in latent space 725) at various noise levels.

Next, a reverse diffusion process 740 (e.g., a U-Net ANN) gradually removes the noise from the noisy features 735 at the various noise levels to obtain denoised image features 745 in latent space 725. In some examples, the denoised image features 745 are compared to the original image features 720 at each of the various noise levels, and parameters of the reverse diffusion process 740 of the diffusion model are updated based on the comparison. For example, this comparison may be made by a perceptual similarity model as described with reference to FIG. 6, which assesses the perceptual similarity differences between the denoised image features 745 and the original image features 720. Finally, an image decoder 750 decodes the denoised image features 745 to obtain an output image 755 in pixel space 710. In some cases, an output image 755 is created at each of the various noise levels. The output image 755 can be compared to the original image 705 to train the reverse diffusion process 740.

In some cases, image encoder 715 and image decoder 750 are pre-trained prior to training the reverse diffusion process 740. In some examples, they are trained jointly, or the image encoder 715 and image decoder 750 and fine-tuned jointly with the reverse diffusion process 740.

The reverse diffusion process 740 can also be guided based on a text prompt 760, or another guidance prompt, such as an image, a layout, a segmentation map, etc. The text prompt 760 can be encoded using a text encoder 765 (e.g., a multimodal encoder) to obtain guidance features 770 in guidance space 775. The guidance features 770 can be combined with the noisy features 735 at one or more layers of the reverse diffusion process 740 to ensure that the output image 755 includes content described by the text prompt 760. For example, guidance features 770 can be combined with the noisy features 735 using a cross-attention block within the reverse diffusion process 740.

Figure 8:
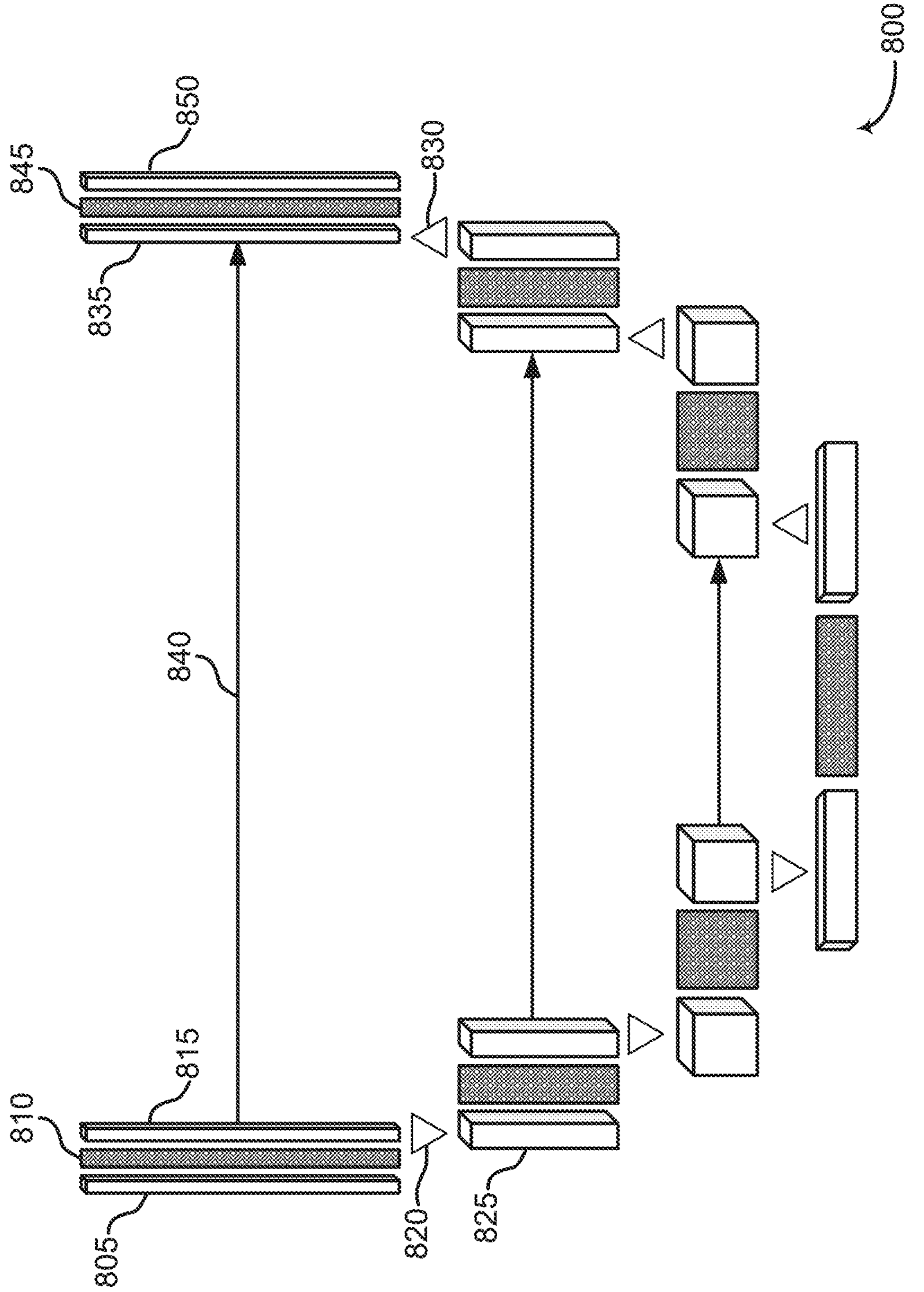
FIG. 8 shows an example of a U-Net according to aspects of the present disclosure.

FIG. 8 shows an example of a U-Net according to aspects of the present disclosure. In some examples, U-Net 800 is an example of the component that performs the reverse diffusion process 725 of guided diffusion model 700 described with reference to FIG. 7 and includes architectural elements of the image generation model 215 described with reference to FIG. 2. The U-Net 800 depicted in FIG. 8 is an example of, or includes aspects of, the architecture used within the reverse diffusion process described with reference to FIG. 7.

In some examples, diffusion models are based on a neural network architecture known as a U-Net. The U-Net 800 takes input features 805 having an initial resolution and an initial number of channels and processes the input features 805 using an initial neural network layer 810 (e.g., a convolutional network layer) to produce intermediate features 815. The intermediate features 815 are then down-sampled using a down-sampling layer 820 such that down-sampled features 825 have a resolution less than the initial resolution and a number of channels greater than the initial number of channels.

This process is repeated multiple times, and then the process is reversed. That is, the down-sampled features 825 are up-sampled using up-sampling process 830 to obtain up-sampled features 835. The up-sampled features 835 can be combined with intermediate features 815 having the same resolution and number of channels via a skip connection 840. These inputs are processed using a final neural network layer 845 to produce output features 850. In some cases, the output features 850 have the same resolution as the initial resolution and the same number of channels as the initial number of channels.

In some cases, U-Net 800 takes additional input features to produce conditionally generated output. For example, the additional input features could include a vector representation of an input prompt. The additional input features can be combined with the intermediate features 815 within the neural network at one or more layers. For example, a cross-attention module can be used to combine the additional input features and the intermediate features 815.

Inference and Training Methods

Figure 9:
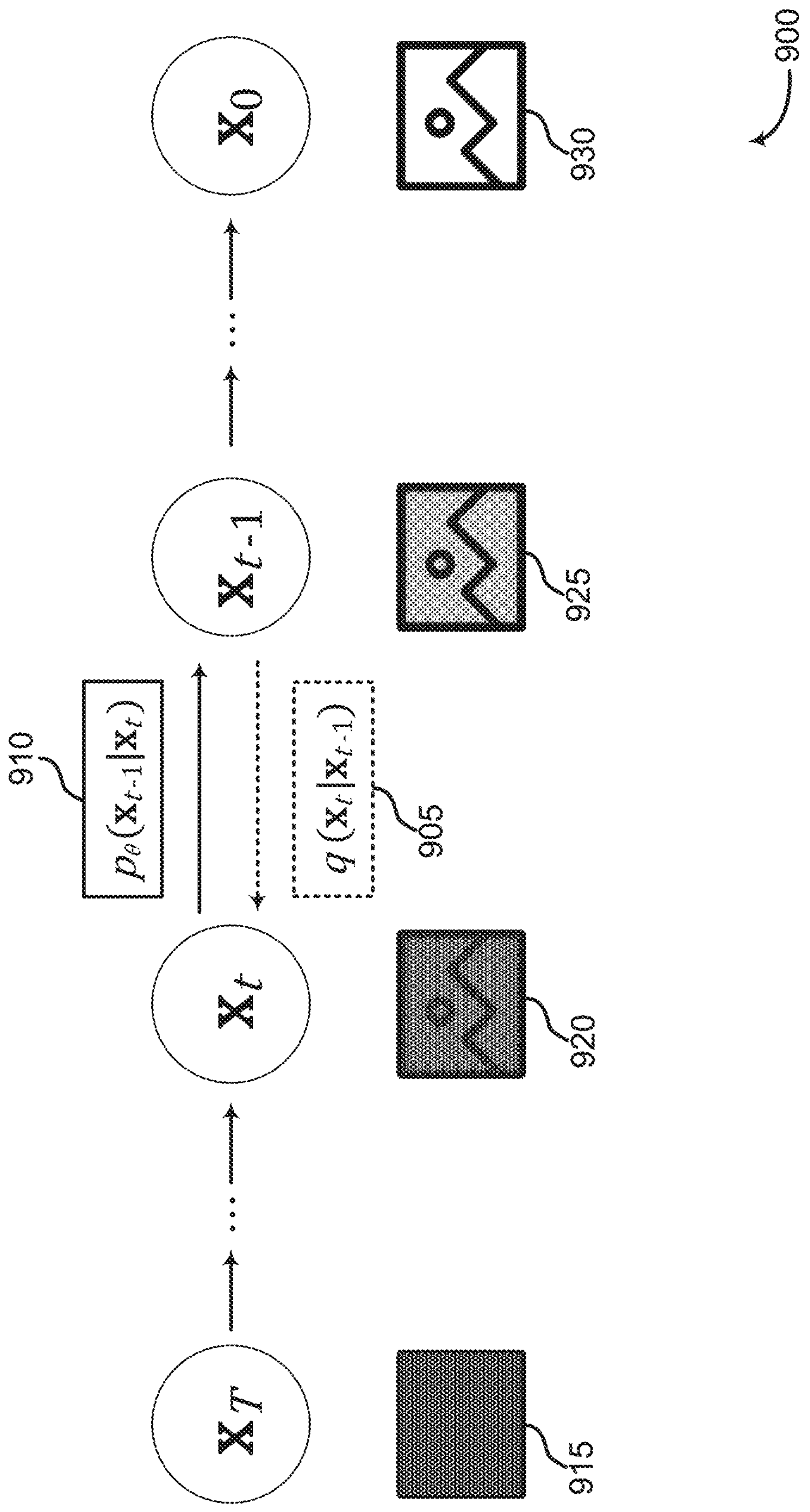
FIG. 9 shows an example of a diffusion process according to aspects of the present disclosure.

FIG. 9 shows a diffusion process 900 according to aspects of the present disclosure. In some examples, diffusion process 900 describes an operation of the image generation model 215 described with reference to FIG. 2, such as the reverse diffusion process 725 of guided diffusion model 700 described with reference to FIG. 7.

As described above with reference to FIG. 7, using a diffusion model can involve both a forward diffusion process 905 for adding noise to an image (or features in a latent space) and a reverse diffusion process 910 for denoising the images (or features) to obtain a denoised image. The forward diffusion process 905 can be represented as $q(x_t|x_{t-1})$, and the reverse diffusion process 910 can be represented as $p(x_{t-1}|x_t)$. In some cases, the forward diffusion process 905 is used during training to generate images with successively greater noise, and a neural network is trained to perform the reverse diffusion process 910 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 910, the model begins with noisy data $x_T$, such as a noisy image 915 and denoises the data to obtain the $p(x_{t-1}|x_t)$. At each step t−1, the reverse diffusion process 910 takes $x_t$, such as first intermediate image 920, and t as input. Here, t represents a step in the sequence of transitions associated with different noise levels, The reverse diffusion process 910 outputs $x_{t-1}$, such as second intermediate image 925 iteratively until $x_T$ reverts back to $x_0$, the original image 930. The reverse process can be represented as:

$$p_\theta(x_{t-1}|x_t) := N\left(x_{t-1}; \mu_\theta(x_t, t), \sum\nolimits_\theta(x_t, t)\right) \tag{5}$$

The joint probability of a sequence of samples in the Markov chain can be written as a product of conditionals and the marginal probability:

$$x_T : p_\theta(x_{0:T}) := p(x_T)\prod\nolimits_{t=1}^{T} p_\theta(x_{t-1}|x_t) \tag{6}$$

where $p(x_T)=N(x_T; 0, I)$ is the pure noise distribution as the reverse process takes the outcome of the forward process, a sample of pure noise, as input and $$\prod_{t=1}^{T} p_\theta(x_{t-1}|x_t)$$

represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and x represents the generated image with high image quality.

Figure 10:
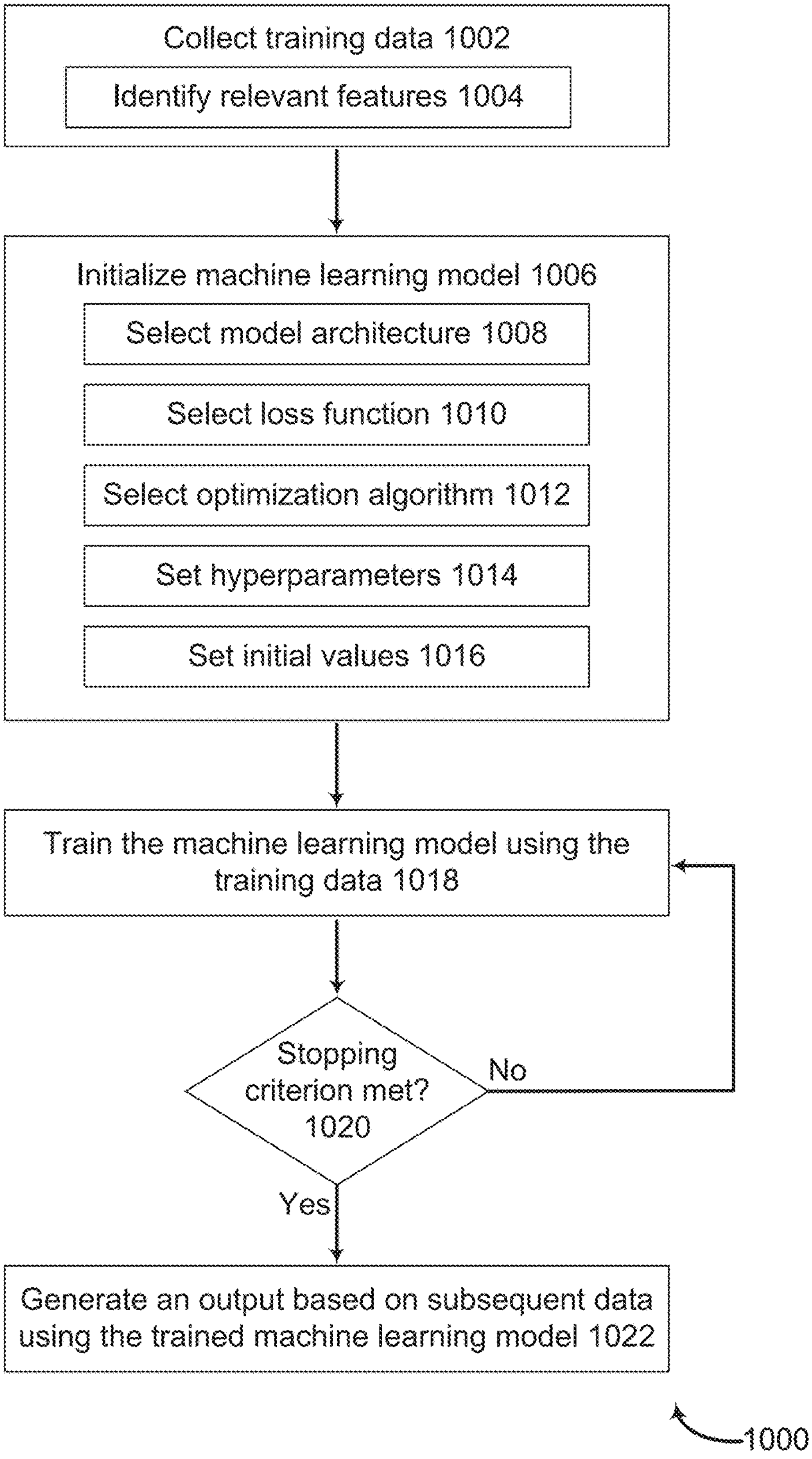
FIG. 10 shows an example of an algorithm for training a machine-learning model according to aspects of the present disclosure.

FIG. 10 is a flow diagram depicting an algorithm as a step-by-step procedure 1000 in an example implementation of operations performable for training a machine-learning model. In some embodiments, the procedure 1000 describes an operation of the training component 225 described for configuring the image generation model 215 as described with reference to FIG. 2. The procedure 1000 further applies to training the perceptual similarity model 315 as described with reference to FIG. 3. The procedure 1000 provides one or more examples of generating training data, use of the training data to train a machine-learning model, and use of the trained machine-learning model to perform a task.

To begin in this example, a machine-learning system collects training data (block 1002) that is to be used as a basis to train a machine-learning model, i.e., which defines what is being modeled. The training data is collectable by the machine-learning system from a variety of sources. Examples of training data sources include public datasets, service provider system platforms that expose application programming interfaces (e.g., social media platforms), user data collection systems (e.g., digital surveys and online crowdsourcing systems), and so forth. Training data collection may also include data augmentation and synthetic data generation techniques to expand and diversify available training data, balancing techniques to balance a number of positive and negative examples, and so forth. Datasets used to train a perceptual similarity model are described with reference to FIG. 6.

The machine-learning system is also configurable to identify features that are relevant (block 1004) to a type of task, for which the machine-learning model is to be trained. Task examples include classification, natural language processing, generative artificial intelligence, recommendation engines, reinforcement learning, clustering, and so forth. To do so, the machine-learning system collects the training data based on the identified features and/or filters the training data based on the identified features after collection. The training data is then utilized to train a machine-learning model.

In order to train the machine-learning model in the illustrated example, the machine-learning model is first initialized (block 1006). Initialization of the machine-learning model includes selecting a model architecture (block 1008) to be trained. Examples of model architectures include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

A loss function is also selected (block 1010). The loss function is utilized to measure a difference between an output of the machine-learning model (i.e., predictions) and target values (e.g., as expressed by the training data) to be used to train the machine-learning model. For example, when training an image generation model such as the one described with reference to FIG. 2, embodiments may utilize an MSE loss or a perceptual similarity loss. When training a perceptual similarity model as described with reference to FIG. 3, embodiments may utilize a training objective as described with reference to Equations 1-4. Additionally, an optimization algorithm is selected (1012) that is to be used in conjunction with the loss function to optimize parameters of the machine-learning model during training, examples of which include gradient descent, stochastic gradient descent (SGD), and so forth.

Initialization of the machine-learning model further includes setting initial values of the machine-learning model (block 1014) examples of which includes initializing weights and biases of nodes to improve efficiency in training and computational resources consumption as part of training. Hyperparameters are also set that are used to control training of the machine learning model, examples of which include regularization parameters, model parameters (e.g., a number of layers in a neural network), learning rate, batch sizes selected from the training data, and so on. The hyperparameters are set using a variety of techniques, including use of a randomization technique, through use of heuristics learned from other training scenarios, and so forth.

The machine-learning model is then trained using the training data (block 1018) by the machine-learning system. A machine-learning model refers to a computer representation that can be tuned (e.g., trained and retrained) based on inputs of the training data to approximate unknown functions. In particular, the term machine-learning model can include a model that utilizes algorithms (e.g., using the model architectures described above) to learn from, and make predictions on, known data by analyzing training data to learn and relearn to generate outputs that reflect patterns and attributes expressed by the training data.

Examples of training types include supervised learning that employs labeled data, unsupervised learning that involves finding an underlying structures or patterns within the training data, reinforcement learning based on optimization functions (e.g., rewards and/or penalties), use of nodes as part of "deep learning," and so forth. The machine-learning model, for instance, is configurable as including a plurality of nodes that collectively form a plurality of layers. The layers, for instance, are configurable to include an input layer, an output layer, and one or more hidden layers. Calculations are performed by the nodes within the layers through the hidden states through a system of weighted connections that are "learned" during training, e.g., through use of the selected loss function and backpropagation to optimize performance of the machine-learning model to perform an associated task.

As part of training the machine-learning model, a determination is made as to whether a stopping criterion is met (decision block 1020), i.e., which is used to validate the machine-learning model. The stopping criterion is usable to reduce overfitting of the machine-learning model, reduce computational resource consumption, and promote an ability of the machine-learning model to address previously unseen data, i.e., that is not included specifically as an example in the training data. Examples of a stopping criterion include but are not limited to a predefined number of epochs, validation loss stabilization, achievement of a performance improvement threshold, whether a threshold level of accuracy has been met, or based on performance metrics such as precision and recall. If the stopping criterion has not been met ("no" from decision block 1020), the procedure 1000 continues training of the machine-learning model using the training data (block 1018) in this example.

If the stopping criterion is met ("yes" from decision block 1020), the trained machine-learning model is then utilized to generate an output based on subsequent data (block 1022). The trained machine-learning model, for instance, is trained to perform a task as described above and therefore once trained is configured to perform that task based on subsequent data received as an input and processed by the machine-learning model.

Figure 11:
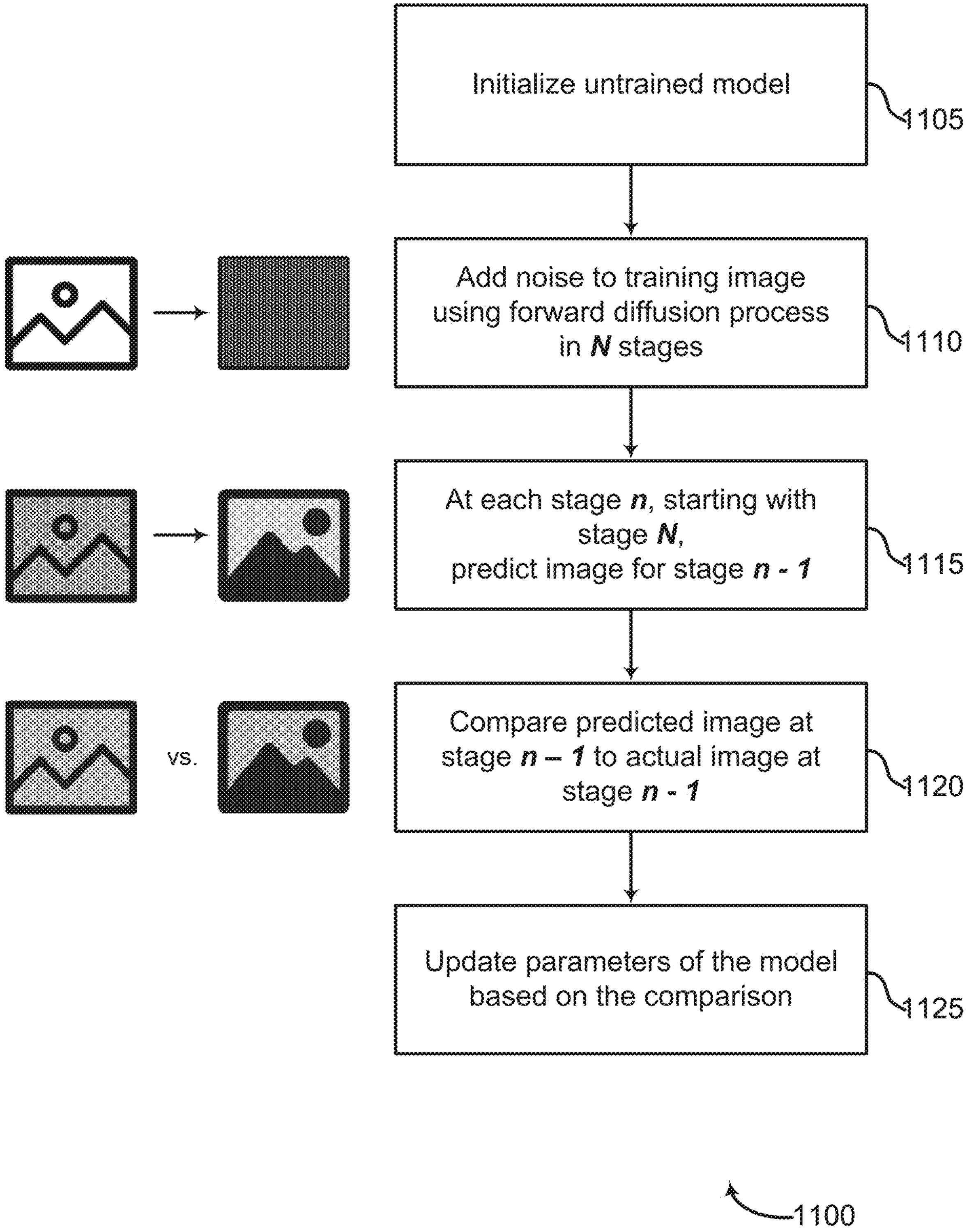
FIG. 11 shows an example of a method for training a diffusion model according to aspects of the present disclosure.

FIG. 11 shows an example of a method 1100 for training a diffusion model according to aspects of the present disclosure. In some embodiments, the method 1100 describes an operation of the training component 225 described for configuring the image generation model 215 as described with reference to FIG. 2. The method 1100 represents an example for training a reverse diffusion process as described above with reference to FIG. 4. In some examples, these operations are performed by a system including a processor executing a set of codes to control functional elements of an apparatus, such as the guided diffusion model described in FIG. 1.

Additionally or alternatively, certain processes of method 1100 may be performed using special-purpose hardware. Generally, these operations are performed according to the methods and processes described in accordance with aspects of the present disclosure. In some cases, the operations described herein are composed of various substeps or are performed in conjunction with other operations.

At operation 1105, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1110, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1115, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 1120, the system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data. In some embodiments, the diffusion model may be trained according to the perceptual loss objective as described with reference to Equations 1-4.

At operation 1125, the system updates parameters of the model based on the comparison. For example, parameters of a U-Net may be updated using gradient descent. Time-dependent parameters of the Gaussian transitions can also be learned.

Figure 12:
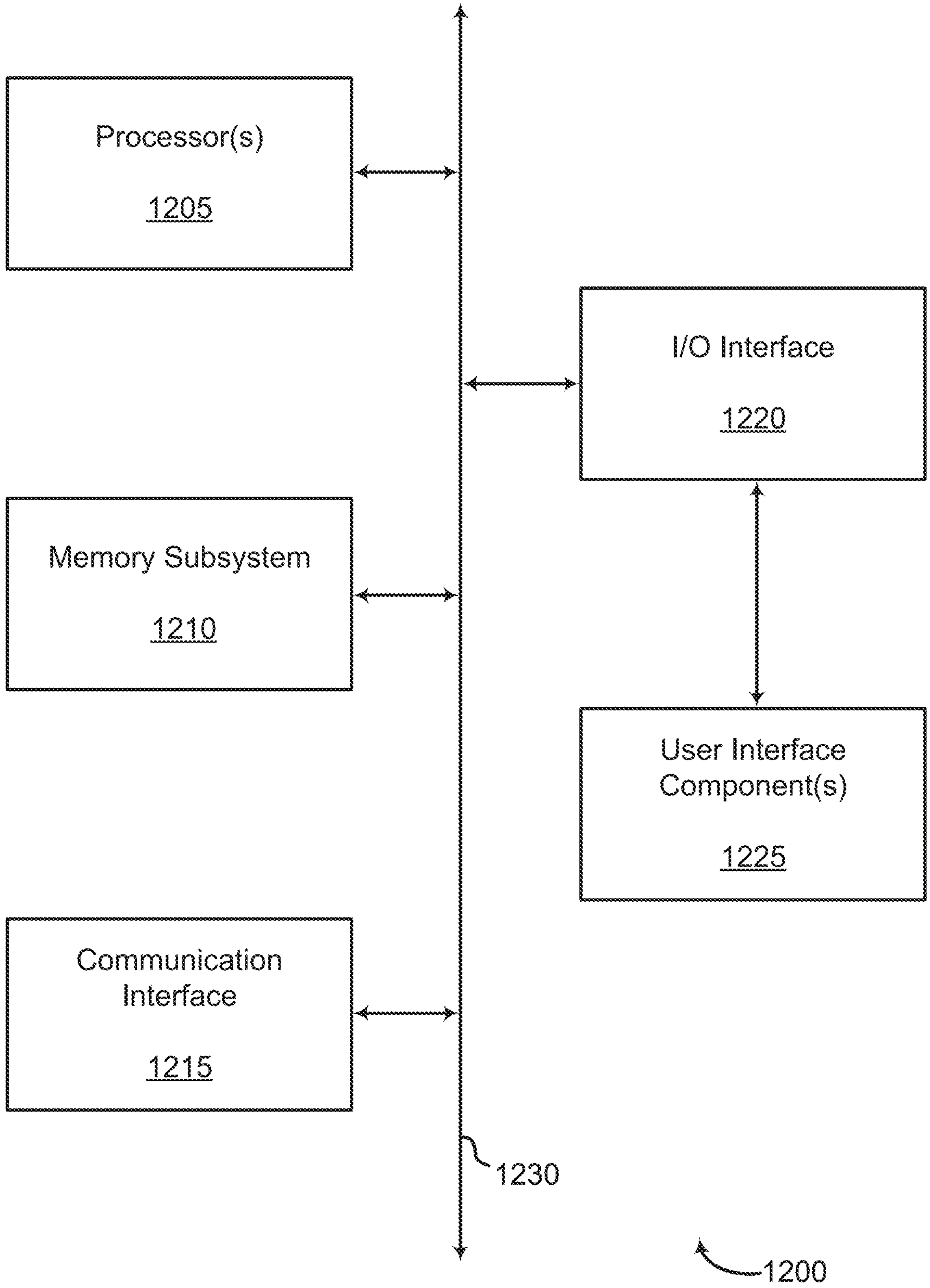
FIG. 12 shows an example of a computing device according to aspects of the present disclosure.

FIG. 12 shows an example of a computing device 1200 according to aspects of the present disclosure. The example shown includes computing device 1200, processor(s) 1205, memory subsystem 1210, communication interface 1215, I/O interface 1220, user interface component(s), and channel 1230.

In some embodiments, computing device 1200 is an example of, or includes aspects of, image processing apparatus 200 of FIG. 2, or the perceptual similarity apparatus of FIG. 3, or both. In some embodiments, computing device 1200 includes one or more processors 1205 are configured to execute instructions stored in memory subsystem 1210 to obtain an input prompt describing an image element; generate, using an image generation model, a latent code representing the image element, wherein the image generation model is trained based on a latent code perceptual similarity between training latent codes; and generate, using the image generation model, a synthetic image depicting the image element based on the latent code.

According to some aspects, computing device 1200 includes one or more processors 1205. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. The memory may store various parameters of machine learning models used in the components described with reference to FIG. 2. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1215 operates at a boundary between communicating entities (such as computing device 1200, one or more user devices, a cloud, and one or more databases) and channel 1230 and can record and process communications. In some cases, communication interface 1215 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1220 is controlled by an I/O controller to manage input and output signals for computing device 1200. In some cases, I/O interface 1220 manages peripherals not integrated into computing device 1200. In some cases, I/O interface 1220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1220 or via hardware components controlled by the I/O controller.

According to some aspects, user interface component(s) 1225 enable a user to interact with computing device 1200. In some cases, user interface component(s) 1225 include an audio device, such as an external speaker system, an external display device such as a display screen, an input device (e.g., a remote-control device interfaced with a user interface directly or through the I/O controller), or a combination thereof. In some cases, user interface component(s) 1225 include a GUI, such as the one described with reference to FIG. 2.

Figure 13:
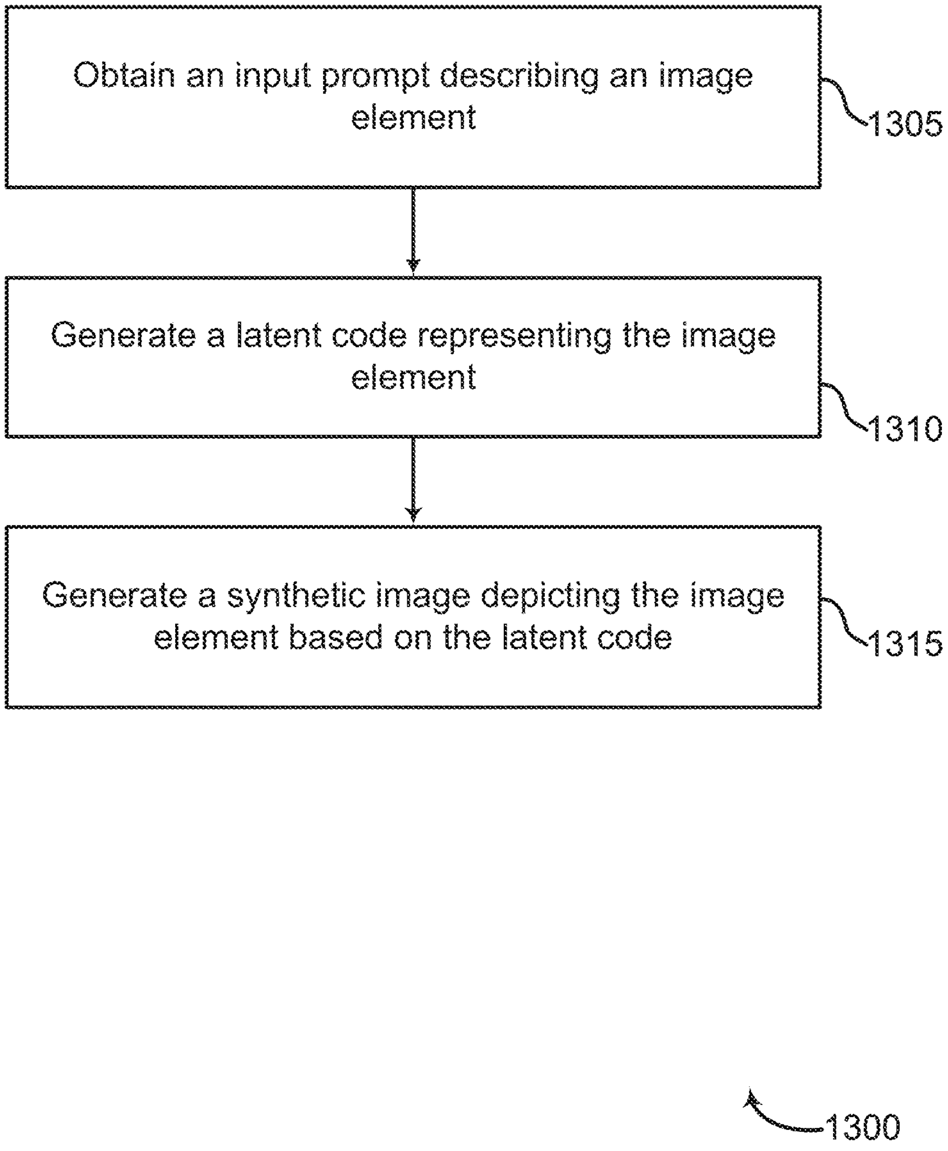
FIG. 13 shows an example of a method for generating synthetic images according to aspects of the present disclosure.

FIG. 13 shows an example of a method 1300 for generating synthetic images according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps or are performed in conjunction with other operations.

At operation 1305, the system obtains an input prompt describing an image element. In some cases, the operations of this step refer to, or may be performed by, an image processing apparatus as described with reference to FIGS. 1 and 2. A user may provide the input prompt via a GUI of the image processing apparatus. In an example, the input prompt includes a text description of the image the user wishes to generate.

At operation 1310, the system generates a latent code representing the image element, where the image generation model is trained based on a latent code perceptual similarity between training latent codes. In some cases, the operations of this step refer to, or may be performed by, an image generation model as described with reference to FIG. 2. For example, the image generation model may generate the latent code by denoising a noisy latent code in the process described with reference to FIG. 7. Additional detail regarding the latent code perceptual similarity is provided with reference to FIGS. 6 and 14.

At operation 1315, the system generates, using the image generation model, a synthetic image depicting the image element based on the latent code. In some cases, the operations of this step refer to, or may be performed by, an image generation model as described with reference to FIG. 2. For example, a decoder of the image generation model may decode the fully denoised latent code to transform the fully denoised latent code to the pixel space. Additional detail regarding this process is provided with reference to FIG. 7.

Figure 14:
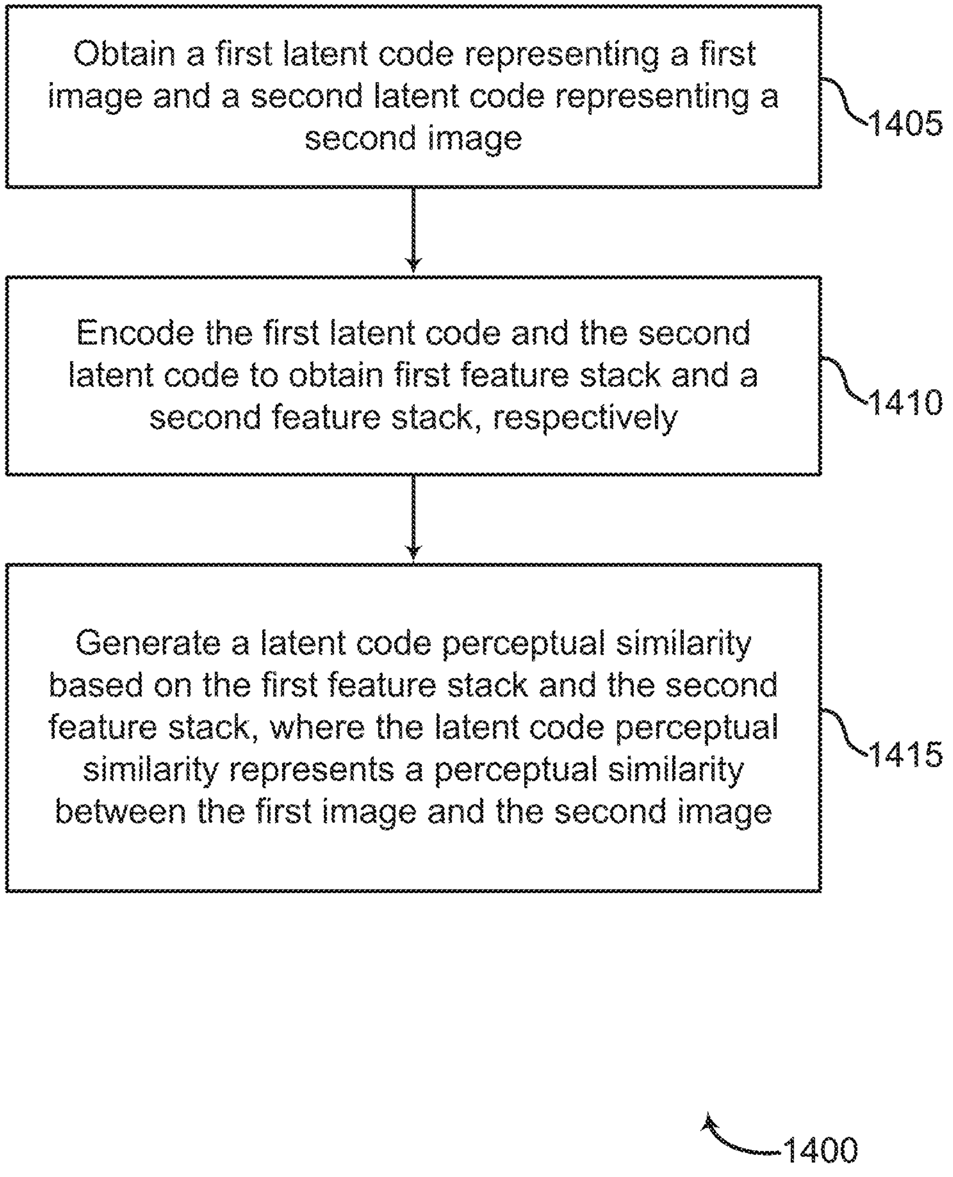
FIG. 14 shows an example of a method for obtaining a perceptual similarity between latent codes according to aspects of the present disclosure.

FIG. 14 shows an example of a method 1400 for obtaining a perceptual similarity between latent codes according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps or are performed in conjunction with other operations.

At operation 1405, the system obtains a first latent code representing a first image and a second latent code representing a second image. In some cases, the operations of this step refer to, or may be performed by, a perceptual similarity apparatus as described with reference to FIGS. 1 and 3. For example, the perceptual similarity apparatus may obtain the first latent code as an output from an image generation model as described with reference to FIG. 2. The perceptual similarity apparatus may obtain the second latent code from another source, such as a training dataset.

At operation 1410, the system encodes the first latent code and the second latent code to obtain a first feature stack and a second feature stack, respectively. In some cases, the operations of this step refer to, or may be performed by, a perceptual similarity model as described with reference to FIGS. 3, 4, and 6. The perceptual similarity model includes feature extractor networks that are configured to extract a plurality of levels of features from an input code, where each level represents different abstract aspects of the latent code. Additional detail regarding the feature extraction process is provided with reference to FIG. 6.

At operation 1415, the system generates a latent code perceptual similarity based on the first feature stack and the second feature stack, where the latent code perceptual similarity represents a perceptual similarity between the first image and the second image. In some cases, the operations of this step refer to, or may be performed by, the perceptual similarity model. For example, the perceptual similarity model may combine the first feature stack and the second feature stack using subtraction to generate a combined feature stack, and then perform a channel-wise averaging process of the combined feature stack to generate a scalar value as the latent code perceptual similarity. This value may be used, for example, in a training process of the image generation model as described with reference to FIG. 2.

Accordingly, the present disclosure includes the following aspects.

A method for image generation is described. One or more aspects of the method include obtaining an input prompt describing an image element; generating, using an image generation model, a latent code representing the image element, wherein the image generation model is trained based on a latent code perceptual similarity between training latent codes; and generating, using the image generation model, a synthetic image depicting the image element based on the latent code.

In some aspects, the latent code perceptual similarity represents a similarity between a predicted latent code and ground truth latent code. In some aspects, the latent code perceptual similarity is computed without decoding the training latent codes.

Some examples of the method, apparatus, non-transitory computer readable medium, and system further include obtaining a noise map. Some examples further include denoising the noise map to obtain the latent code. Some examples further include decoding the latent code to obtain the synthetic image.

A method for computing a latent code perceptual similarity is described. One or more aspects of the method include obtaining a first latent code representing a first image and a second latent code representing a second image; encoding, using a perceptual similarity model, the first latent code and the second latent code to obtain a first feature stack and a second feature stack, respectively; and generating, using the perceptual similarity model, a latent code perceptual similarity based on the first feature stack and the second feature stack, wherein the latent code perceptual similarity represents a perceptual similarity between the first image and the second image.

Some examples of the method, apparatus, non-transitory computer readable medium, and system further include successively generating features at a plurality of levels, wherein each successive level of the plurality of levels has a smaller number of pixels or a larger number of channels than a previous level of the plurality of levels. Some examples further include generating a combined feature stack by combining the first feature stack and the second feature stack, wherein the latent code perceptual similarity is based on the combined feature stack.

Some examples further include normalizing the first feature stack and the second feature stack to obtain a first normalized feature stack and a second normalized feature stack, respectively. Some examples further include subtracting the second normalized feature stack from the first normalized feature stack to obtain the combined feature stack. Some examples further include weighting the combined feature stack using weights of the perceptual similarity model to obtain a weighted feature stack, wherein the latent code perceptual similarity is based on the weighted feature stack. Some examples further include computing an L1 norm and a spatial average based on the weighted feature stack to obtain the latent code perceptual similarity.

Some examples of the method, apparatus, non-transitory computer readable medium, and system further include obtaining training data including a positive sample pair of perceptually similar images, wherein the first image and the second image correspond to the positive sample pair. Some examples further include training, using the training data, the perceptual similarity model to generate the latent code perceptual similarity. Some examples further include obtaining additional training data including a negative sample pair of perceptually dissimilar images, wherein the perceptual similarity model is trained based on the additional training data. Additional description regarding the training process for a perceptual similarity model is provided with reference to FIG. 6.

Some examples of the method, apparatus, non-transitory computer readable medium, and system further include computing a perceptual similarity loss based on the latent code perceptual similarity. Some examples further include training an image generation model based on the perceptual similarity loss.

An apparatus for image processing is described. One or more aspects of the apparatus include at least one processor; at least one memory storing instructions executable by the at least one processor; and an image generation model comprising parameters stored in the at least one memory and trained to generate a latent code representing an image element and to generate a synthetic image depicting the image element based on the latent code, wherein the image generation model is trained based on a latent code perceptual similarity between training latent codes.

Some examples of the apparatus, system, and method further include a perceptual similarity model trained to generate the latent code perceptual similarity. In some aspects, the perceptual similarity model comprises a feature pyramid network comprising a plurality of feature levels. In some aspects, the perceptual similarity model generates the latent code perceptual similarity without decoding the training latent codes.

In some aspects, the image generation model comprises a latent diffusion model. The image generation model may further comprise a decoder trained to decode the latent code.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word “or” indicates an inclusive list such that, for example, the list of X, Y, or Z means X or Y or Z or XY or XZ or YZ or XYZ. Also the phrase “based on” is not used to represent a closed set of conditions. For example, a step that is described as “based on condition A” may be based on both condition A and condition B. In other words, the phrase “based on” shall be construed to mean “based at least in part on.” Also, the words “a” or “an” indicate “at least one.”

What is claimed is:

1. A method of training an image generation model, the method comprising:

training, by one or more processors, an image generation model based on a latent code perceptual similarity, wherein parameters of the image generation model are stored in a memory, and wherein the image generation model is trained by:

obtaining training data including a first latent code representing a first image in a latent space and a second latent code representing a second image in the latent space;

encoding, using a perceptual similarity model, the first latent code and the second latent code to obtain a first feature stack and a second feature stack, wherein the perceptual similarity model comprises a plurality of feature extractors, wherein the first latent code and the second latent code are provided to the plurality of feature extractors as input in an encoded form in the latent space, and wherein the first feature stack and the second feature stack comprise outputs of the plurality of feature extractors, respectively; and generating, using the perceptual similarity model, the latent code perceptual similarity based on the first feature stack and the second feature stack, wherein the latent code perceptual similarity represents a perceptual similarity between the first image and the second image; and updating the parameters of the image generation model stored in the memory based on the latent code perceptual similarity.

2. The method of claim 1, wherein the encoding comprises:

successively generating features at a plurality of levels, wherein each successive level of the plurality of levels has a smaller number of pixels or a larger number of channels than a previous level of the plurality of levels.

3. The method of claim 1, wherein generating the latent code perceptual similarity comprises:

generating a combined feature stack by combining the first feature stack and the second feature stack, wherein the latent code perceptual similarity is based on the combined feature stack.

4. The method of claim 3, wherein generating the combined feature stack comprises:

normalizing the first feature stack and the second feature stack to obtain a first normalized feature stack and a second normalized feature stack, respectively; and subtracting the second normalized feature stack from the first normalized feature stack to obtain the combined feature stack.

5. The method of claim 3, further comprising:

weighting the combined feature stack using weights of the perceptual similarity model to obtain a weighted feature stack, wherein the latent code perceptual similarity is based on the weighted feature stack.

6. The method of claim 5, further comprising:

computing an L1 norm and a spatial average based on the weighted feature stack to obtain the latent code perceptual similarity.

7. The method of claim 1, further comprising:

obtaining additional training data including a positive sample pair of perceptually similar images, wherein the first image and the second image correspond to the positive sample pair;

training, using the additional training data, the perceptual similarity model to generate the latent code perceptual similarity.

8. The method of claim 7, further comprising:

obtaining additional training data including a negative sample pair of perceptually dissimilar images, wherein the perceptual similarity model is trained based on the additional training data.

9. The method of claim 1, wherein obtaining the training data comprises:

encoding the first image and the second image to obtain the first latent code and the second latent code, respectively.

10. A non-transitory computer readable medium storing code, the code comprising instructions that, when executed by at least one processor, cause the at least one processor to perform operations comprising:

training, by the at least one processor, an image generation model based on a latent code perceptual similarity, wherein parameters of the image generation model are stored in the non-transitory computer readable medium, and wherein the image generation model is trained by:

obtaining training data including a first latent code representing a first image in a latent space and a second latent code representing a second image in the latent space;

encoding, using a perceptual similarity model, the first latent code and the second latent code to obtain a first feature stack and a second feature stack, wherein the perceptual similarity model comprises a plurality of feature extractors, wherein the first latent code and the second latent code are provided to the plurality of feature extractors as input in an encoded form in the latent space, and wherein the first feature stack and the second feature stack comprise outputs of the plurality of feature extractors, respectively; and generating, using the perceptual similarity model, the latent code perceptual similarity based on the first feature stack and the second feature stack, wherein the latent code perceptual similarity represents a perceptual similarity between the first image and the second image; and updating parameters of the image generation model stored in the non-transitory computer readable medium based on the latent code perceptual similarity.

11. The non-transitory computer readable medium of claim 10, wherein the encoding comprises:

successively generating features at a plurality of levels, wherein each successive level of the plurality of levels has a smaller number of pixels or a larger number of channels than a previous level of the plurality of levels.

12. The non-transitory computer readable medium of claim 10, wherein generating the latent code perceptual similarity comprises:

generating a combined feature stack by combining the first feature stack and the second feature stack, wherein the latent code perceptual similarity is based on the combined feature stack.

13. The non-transitory computer readable medium of claim 12, wherein generating the combined feature stack comprises:

normalizing the first feature stack and the second feature stack to obtain a first normalized feature stack and a second normalized feature stack, respectively; and subtracting the second normalized feature stack from the first normalized feature stack to obtain the combined feature stack.

14. The non-transitory computer readable medium of claim 10, the code further comprising instructions that, when executed by the at least one processor, cause the at least one processor to perform operations comprising:

weighting the combined feature stack using weights of the perceptual similarity model to obtain a weighted feature stack, wherein the latent code perceptual similarity is based on the weighted feature stack.

15. The non-transitory computer readable medium of claim 10, the code further comprising instructions that, when executed by the at least one processor, cause the at least one processor to perform operations comprising:

computing an L1 norm and a spatial average based on the weighted feature stack to obtain the latent code perceptual similarity.

16. The non-transitory computer readable medium of claim 10, the code further comprising instructions that, when executed by the at least one processor, cause the at least one processor to perform operations comprising:

obtaining additional training data including a positive sample pair of perceptually similar images, wherein the first image and the second image correspond to the positive sample pair;

training, using the additional training data, the perceptual similarity model to generate the latent code perceptual similarity.

17. The non-transitory computer readable medium of claim 10, the code further comprising instructions that, when executed by the at least one processor, cause the at least one processor to perform operations comprising:

obtaining additional training data including a negative sample pair of perceptually dissimilar images, wherein the perceptual similarity model is trained based on the additional training data.

18. The non-transitory computer readable medium of claim 10, wherein obtaining the training data comprises:

encoding the first image and the second image to obtain the first latent code and the second latent code, respectively.

* * * * *